United States Patent [19]
Brushwood

[11] Patent Number: 5,551,766
[45] Date of Patent: Sep. 3, 1996

[54] EMPTY/LOAD SENSOR MECHANISM FOR CONTROLLED VEHICLE BRAKING

[75] Inventor: Daniel H. Brushwood, Greenville, S.C.

[73] Assignee: Ellcon National, Inc., N.Y.

[21] Appl. No.: 320,853

[22] Filed: Oct. 11, 1994

[51] Int. Cl.$^6$ ............................................. B60T 8/18
[52] U.S. Cl. ................... 303/22.2; 74/569; 74/571 R
[58] Field of Search .................. 303/22.2, 22.6, 303/22.7, 22.8; 188/195; 105/418; 74/569, 571, 104, 107

[56] References Cited

U.S. PATENT DOCUMENTS

| | | | |
|---|---|---|---|
| 1,031,887 | 7/1912 | Taylor | 105/418 |
| 3,696,684 | 10/1972 | Estlick | 74/104 |
| 4,321,985 | 3/1982 | Severinsson et al. | 303/22.2 X |
| 4,653,812 | 3/1987 | Engle | 303/22.2 X |
| 4,726,626 | 2/1988 | Angelillo | 188/195 X |
| 5,106,068 | 4/1992 | McKay | 303/22.2 |

*Primary Examiner*—Lee W. Young
*Attorney, Agent, or Firm*—Brooks Haidt Haffner & Delahunty

[57] ABSTRACT

An empty/load mechanism for controlling the brake pressure on a railroad car is mounted inboard on the web of the car body side sill having a lower flange. A pivotable sensing arm reaches around the side sill flange and has a horizontal contact shaft at its free end for contact with the upper surface of a truck side frame for operating the mechanism in response to the distance between the car body and the truck.

2 Claims, 3 Drawing Sheets

EMPTY/LOAD SENSOR MECHANISM FOR CONTROLLED VEHICLE BRAKING

BACKGROUND OF THE INVENTION

1. Field of the Invention

This invention relates to a mechanism for sensing the distance between two relatively movable vehicle parts, such as the car body and truck of a railroad car, whose relative position is related to the load on the vehicle. An empty/load valve, actuated in response to the load sensed, controls the braking force applied to the vehicle wheels.

2. Description of Related Art

Brake cylinder force modification devices called empty/load valves are well known in the art of railway equipment engineering. See, for example, U.S. Pat. Nos. 4,648,661; 4,826,259; 4,844,554; and 4,824,179. In general, empty/load valves are actuated by movement of a sensing arm that is responsive to movement of a sprung part of a railroad car toward or away from the car wheels depending on the load on the car. A valve or valves is controlled by the sensing arm for diverting air to a storage tank or canister when the load on the car is light, i.e. when the car is empty or lightly loaded. The position of the sensing arm, and hence of a reciprocably movable rod linked to the sensing arm which operates a valve for controlling braking pressure, is determined by the load on the car.

In the past, empty/load sensor devices have been mounted beneath the bottom member of the side sill of the railroad car body. A sensing or measuring arm, or some other kind of trigger member, extended downward from the body of the prior art device to an area of contact with the side frame of a truck in order to sense the relative position of the car's body and the truck to determine the load condition of the car. Such an arrangement is suited to older railroad car designs, which provide ample room for mounting the empty/load sensing device between the bottom of the side sill flange of the car and the top of the truck side frame, even when the car is in fully loaded condition.

The older railroad cars, which provided adequate space for such under-the-sill mounting of an empty/load device, had relatively high centers of gravity compared to new car designs. Attempts to lower the center of gravity of railroad cars, motivated by safety and other considerations, have resulted in a significant reduction of the distance, under fully loaded conditions, between the car side sill flange and the truck frame member. Instead of the conventional five to seven inch separation found in older railroad cars, modern cars can have a space between the sill flange and the opposed frame member as small as one inch or less under full load conditions. This limited space is not large enough to accommodate the conventional mounting of an empty/load sensing device. There are also practical restrictions as to where the empty/load mechanism can be located on the car body if it is to work effectively.

The empty/load sensor mechanism of the present invention can be advantageously employed for modern railroad cars that impose space restraints that are considerably more severe than those of the prior art.

SUMMARY OF THE INVENTION

The empty/load sensor of the present invention is mounted above the lower side sill flange on the web member of a railroad car side sill, and can accordingly be employed for modern cars where the restricted space between the sprung and unsprung parts of the car does not permit the use of prior art empty/load devices. The device of the invention can also be employed for older cars of conventional design.

Mounting of the empty/load sensor mechanism inboard (under) the car body in accordance with the invention means that the horizontally extending side sill flange is interposed between the body of the sensor mechanism and the truck side frame surface to be contacted by the end of the sensing arm. This requires that the sensing arm must reach around the sill flange, rather than extending directly downwardly like the sensing arms or triggers of prior art devices.

In accordance with the present invention, there is provided a sensing arm assembly which includes a rotatable operating shaft that extends outward from the side rather than from the center of the body of the empty/load mechanism and a generally downwardly directed arm mounted on said shaft and which reaches beyond and below the side sill flange. The downwardly directed arm is pivotable around the axis of said shaft and has, at its free end, a horizontally extending contact shaft that passes under the side sill flange to contact an area on the upper surface of the truck side frame.

This arrangement measures the distance between the bottom of the car side sill and the top of the truck side frame. That distance is representative of the loading condition of the car, and rotation of said operating shaft causes a valve or valves to operate to control the fluid pressure in the braking cylinder, and hence, the braking pressure applied to the wheels, in response to the loading of the car.

The horizontally extending contact shaft is mounted on the free end of the arm so that the distance of the horizontal axis of the contact shaft from the axis of the rotatable operating shaft can be adjusted so as to permit adjustment of the rotation of the operating shaft with load. In the preferred embodiment, a rotatable threaded stud extends through the end of the arm and is secured at one end to a disc so as to cause the disc to rotate therewith. One end of the contact shaft is also secured to the disc with its axis displaced from the axis of the stud. Thus, with rotation of the screw, the distance between the axis of the operating shaft and the axis of the contact shaft is changed.

These and other structural and mechanical features, objects and advantages of the empty/load sensor mechanism for controlled vehicle braking will be more fully understood when the following detailed description of a preferred embodiment of the invention is read in conjunction with the accompanying drawing figures, in which like reference characters designate like parts throughout.

DETAILED DESCRIPTION OF PREFERRED EMBODIMENT

The invention will be described in connection with an empty/load mechanism in which the rotation of an operating shaft caused by a pivotable sensing or measuring arm is converted into rectilinear motion for causing operation of the valve which controls pressure of the brake fluid in a brake cylinder which operates the brakes of a car. However, the invention also is applicable to other types of such valves, e.g. valves in which such conversion of the rotary motion of the operating shaft is not necessary.

Figure 1:
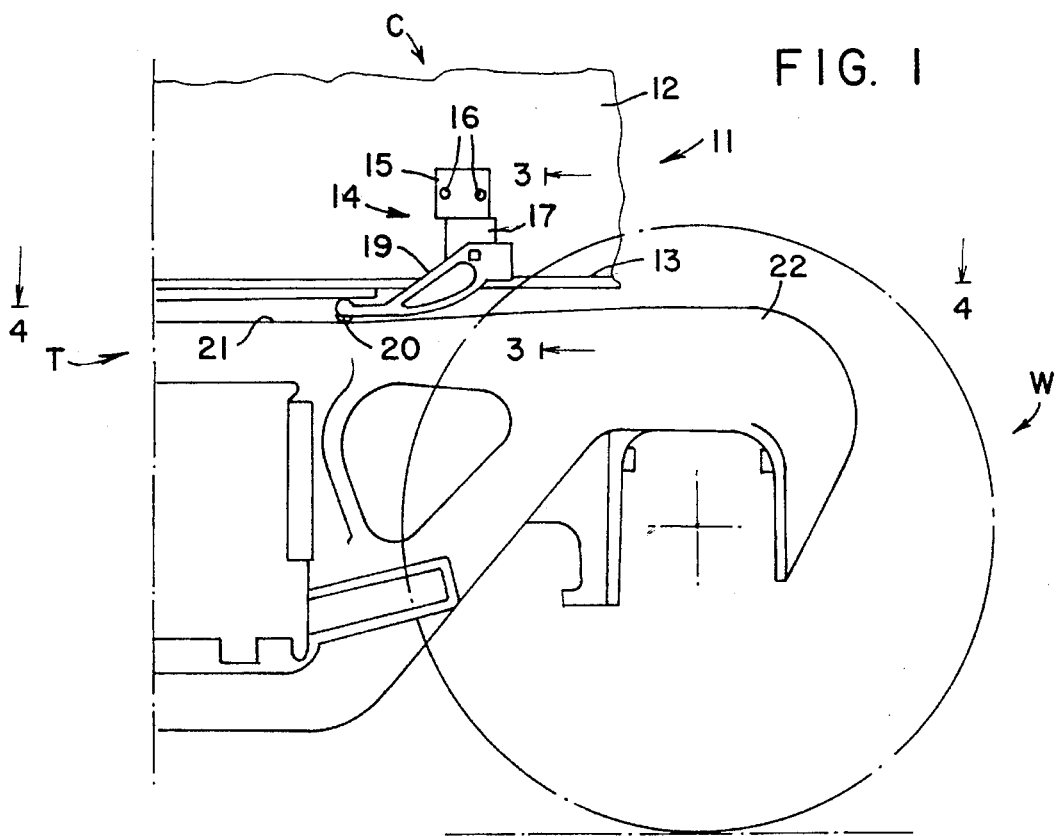
FIG. 1 is a simplified view, looking toward the side of a railroad car, showing the location of the empty/load sensor mechanism for controlled vehicle braking according to the invention relative to the car body and the truck when the car is fully loaded.
Figure 2:
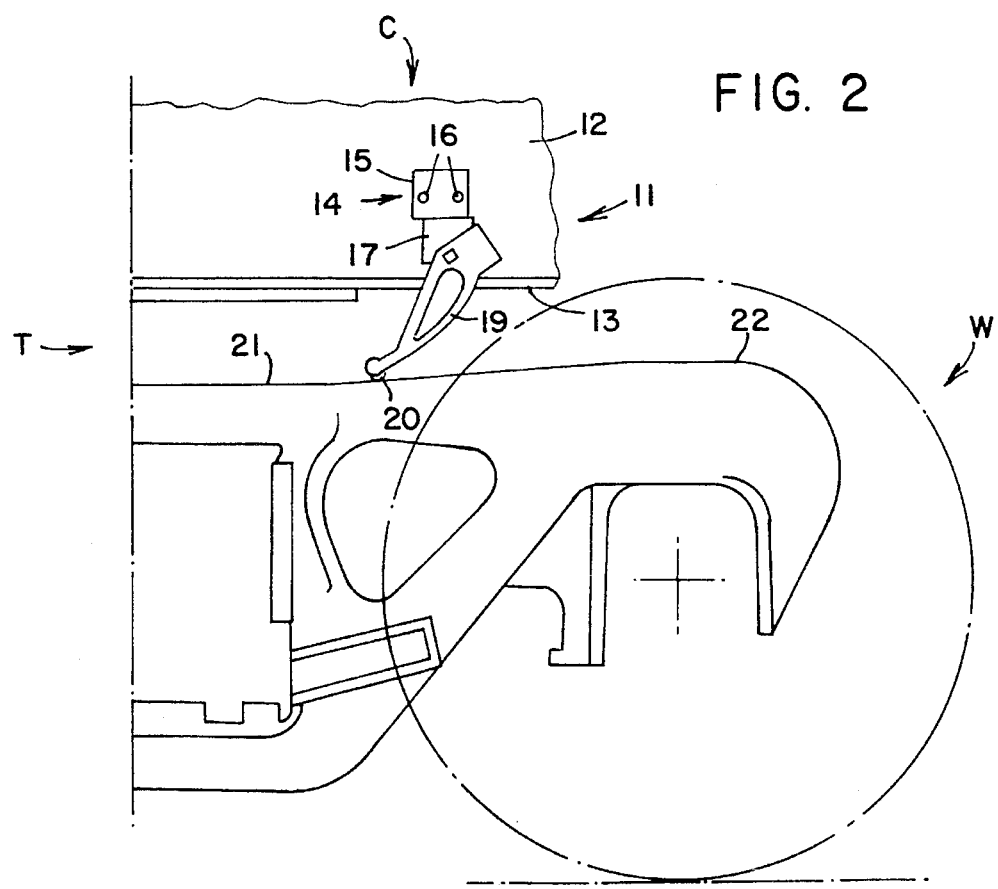
FIG. 2 is a view similar to that of FIG. 1, illustrating an empty car condition.

FIG. 1 illustrates the relative positions of the sprung (car body) and unsprung parts (truck) of a railway car in fully loaded condition. FIG. 2 illustrates the relative positions of the sprung and unsprung parts of the same railway car in an empty (or lightly loaded) condition. In these drawing figures, the car body is generally designated by the reference character C and the truck is generally designated by the reference character T.

Figure 4:
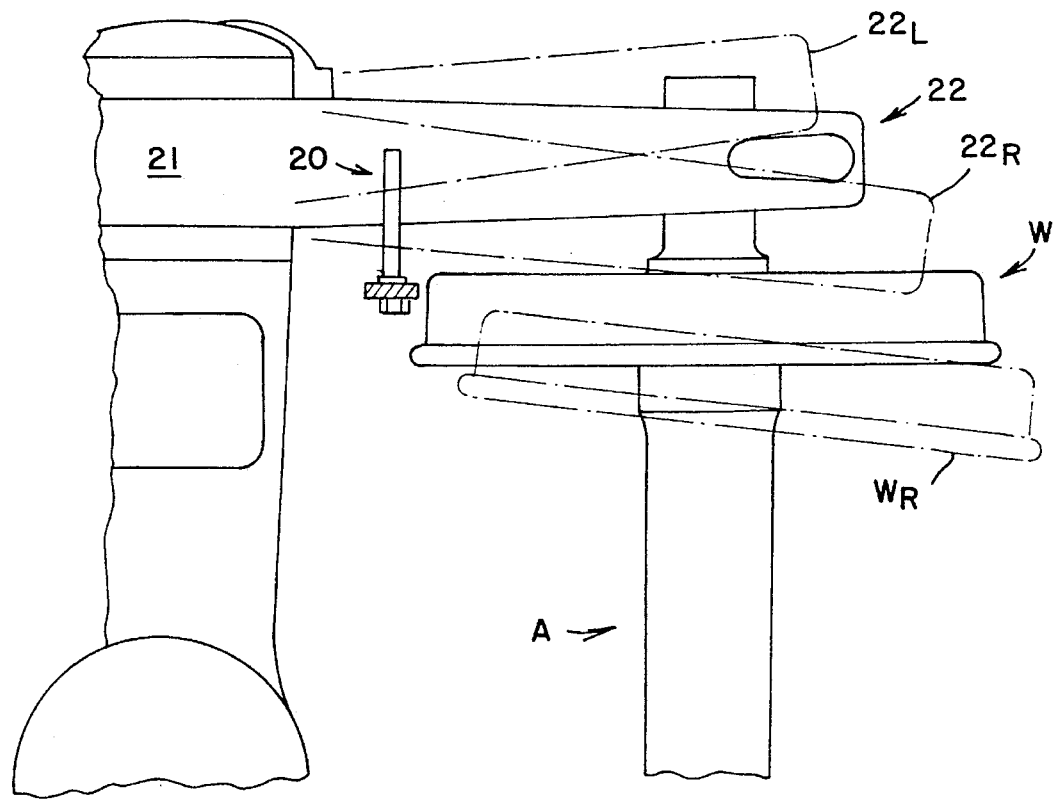
FIG. 4 is a view taken along line 4—4 of FIG. 1 and illustrating, in dashed lines, various orientations that can be assumed by a wheel.

The braking force to be applied to the wheels W associated with an axle, generally designated by reference character A in FIG. 4, of the truck T is related to the load on the car body C. If excessive braking force is applied when the railway car is empty, the wheels may stop rotating and slide on the railroad track. The reduced friction between a sliding wheel and the track renders braking ineffective and can result in flattening of the wheel surface. By sensing the relative distance between the car body and truck, which is related to the load on the car body, and controlling the braking force applied to the wheels by regulating the braking pressure supplied to the brake shoes by the brake cylinder, the empty/load sensor mechanism of the invention responds to changes in car loading. The wheels do not slide on the track in an empty car condition. The brake force applied to the wheels W in the empty condition of FIG. 2 is a fraction of the brake force applied in the fully loaded condition illustrated in FIG. 1.

Figure 3:
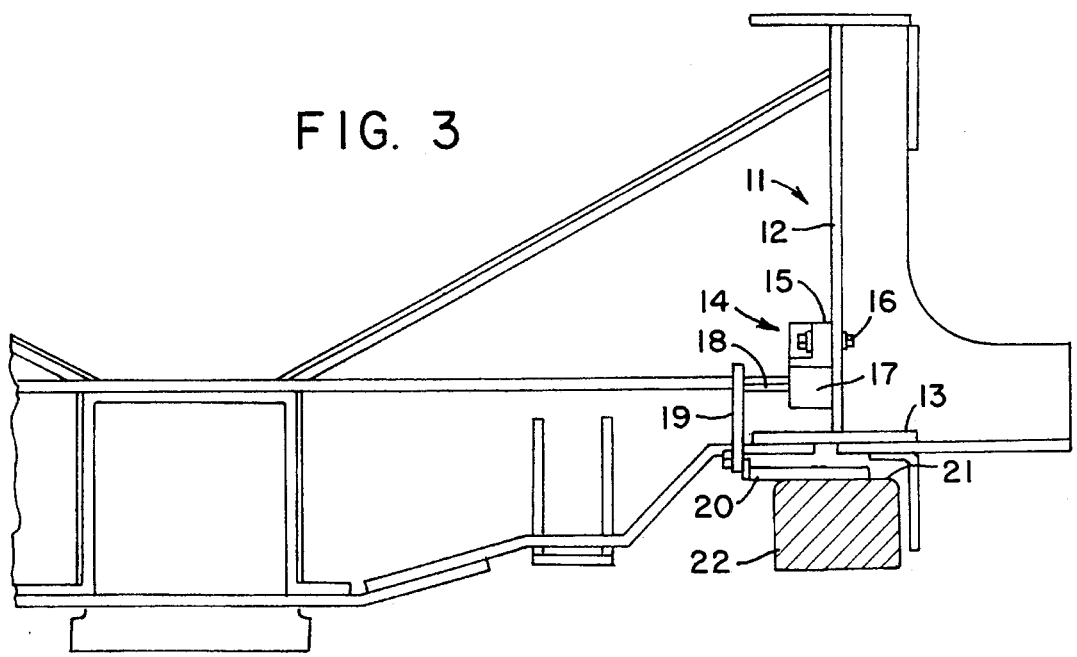
FIG. 3 is a view in section taken along line 3—3 of FIG. 1.

In FIGS. 1 and 2, the side sill of the railway car body C is designated by reference numeral 11. The car body side sill 11 has a vertically extending web portion 12 and a horizontal lower flange 13. As shown in FIG. 3, the lower flange 13 of the body side sill 11 extends in both the inward (leftward in the drawing) and outward (rightward in the drawing) from the lower end of the side sill web 12.

The view of FIG. 3 also shows other structural elements of the car body C which are conventional and need no detailed description, but which are illustrated only to show the preferred inboard mounting position of the empty/load sensor mechanism of the invention, generally designated by reference numeral 14, on the web portion 12 of the side sill 11. It is to be understood that, if desired, the sensor mechanism 14 can be mounted instead on the outboard or opposite side of the web 12 in an obvious manner.

FIGS. 1–3 show the upper body portion 15 of the empty/load sensor mechanism 14 secured to the inner side of the web 12 of the side sill 11 by bolts 16 (two shown in the figures). A generally block-like lower body portion 17 of the empty/load sensor mechanism is beneath the upper body portion 15. A rotatable operating shaft 18, shown in FIGS. 3 and 6, extends horizontally from the side of the lower body portion 17, and a generally downwardly directed arm member 19 is carried by the operating shaft. The arm member 19 extends below the side sill lower flange 13 and is free to move pivotally with the operating shaft 13 on which the arm 19 is mounted.

At its lower, distal or free end, the arm 19 carries a horizontally extending contact shaft 20 that passes under the side sill lower flange 13 to ride on the upper surface 21 of side frame 22 of the truck 23. The range of pivoting movement of the arm 19 with its contact shaft 20 in contact with the upper surface 21 of the truck side frame 22 is illustrated in FIGS. 1 and 2, wherein FIG. 2 illustrates the empty (or lightly loaded) car position of the arm 19 and FIG. 1 shows the position of the arm 19 when the car is fully loaded.

Figures 5, 6, 7:
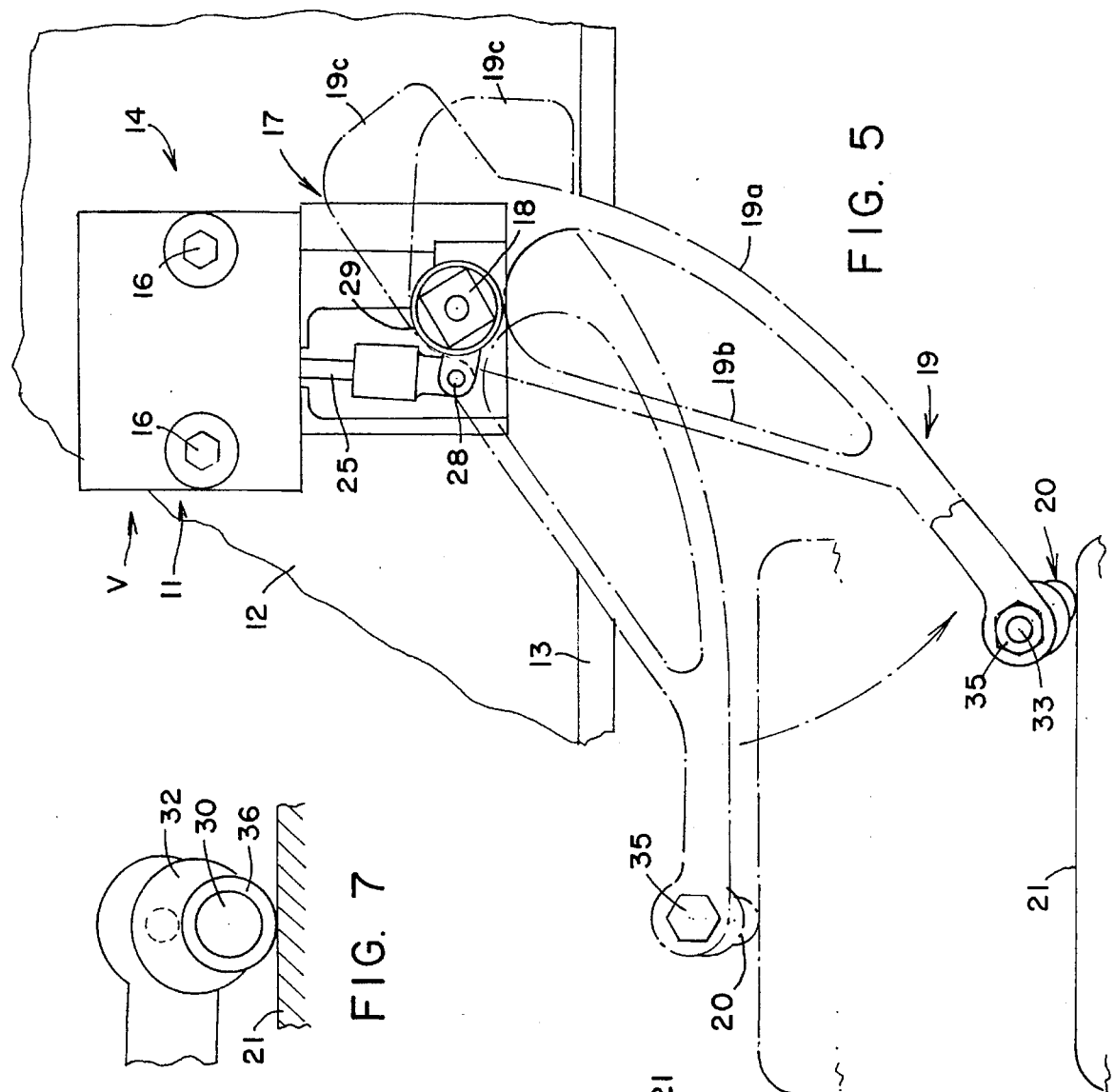
FIG. 5 is a detail view in section of the empty/load sensor mechanism, showing extreme positions of the sensing arm in dashed lines.
FIG. 6 is a fragmentary view in partial cross-section taken perpendicular to the view of FIG. 5 and showing the operating shaft, sensing arm and contact shaft of the mechanism of the invention.
FIG. 7 is an end view of the embodiment shown in FIG. 6.

FIG. 5 shows the empty/load sensor mechanism in greater detail. The upper body portion 15 of the mechanism encloses a conventional valve V for controlling the fluid pressure supplied to the brake cylinder. A rod 25 controls the valve and the lower end of the rod 25 is connected to a link member 28 which is movable by the shaft 18. Thus, the rod 25 is in the extended condition shown in FIG. 5 when the arm 19 is in the empty car position, extending downward to contact the truck frame top surface 21 shown in solid lines in the figure. When the contact shaft 20, and hence, the arm 19, moves upwards to the dot-dash line position shown at the left in FIG. 5 in response to loading on the car, the link 28 and the rod 25 to which the link 28 is attached, are moved upward to a retracted piston position, not shown in the drawing, causing the brake to exert the high braking force appropriate to full load operating conditions. The details of the valve mechanisms for controlling fluid pressure are not shown in detail since such mechanisms are well known in the art.

The preferred structure of the contact shaft 20 is shown in greater detail in FIG. 6. The shaft has a rigid cylindrical rod 30, such as a rod made of steel, secured fixedly at its inner end 31 to an end plate or disc 32 from which a threaded stud 33 secured thereto extends parallel to the rod 30 but spaced, and extending in the opposite direction from the rod 30. The stud 33 passes through an aperture 34 formed in the lower end of the arm 19 and is secured in place and rotational position by a nut 35. A tubular sleeve 36 encircles the rod 30 and can be made of a low friction coefficient material, such as TEFLON. The sleeve 36 can be rotatably mounted on the rod 30 for rolling contact with the upper surface 21 of the side frame 22 as shown in FIG. 6. The sleeve 36 is held on the rod 30 by a washer 37 shown attached to the outer end 38 of the rod 30 by a bolt 39 that is received in a threaded bolt hole bored axially into the outer end 38 of the rod 30.

The distance by which the contact shaft 20 and the stud 33 are offset from each other prevents the end of the arm 19 from coming into contact with the surface 21 as shown in FIG. 6, so the sleeve 36 can move freely along the surface 21, as seen in FIG. 5 which illustrates the fact that the contact shaft 20 moves transversely across the side frame 22 as the car changes from empty to load condition. In addition, due to the fact that the axis of the contact shaft 20 is displaced from the axis of the stud 33, the effective length of the arm 19, i.e. the distance between the axis of the operating shaft 18 and the surface of the contact shaft 20 which engages the surface 21, is adjustable. Thus, by rotating the stud 33, and hence, the plate or disc 32, fine adjustment of the rotational position of the operating shaft 18 at which brake pressure change is produced can be made.

As an alternative mounting arrangement for the contact shaft 20, the stud 33 can be received in a slot at the end of the arm 19.

FIG. 4 shows how the contact shaft 20 maintains contact with the upper surface 21 of the side frame 22 as a railroad car moves through a curve in the supporting rails causing the bolster side frame 22 to move laterally with respect to the side sill 11. Solid lines in FIG. 4 show the position of the bolster side frame 22 and a wheel W as viewed from above when the car is moving along a straight track section. The wheel position $W_R$ shown in dashed lines below the solid-line position is the orientation assumed by the wheel W as the car turns to the right. The dashed line position of the side frame shown at $22_R$ corresponds to the wheel position $W_R$. It will be seen that the contact shaft 22 maintains continuous sensing contact with the side frame upper surface 21 as the wheel W turns to the right. The position of the side frame shown in dashed lines at $22_L$ illustrates how sensing arm contact is maintained as the wheel W turns to the left.

The arm 19 is preferably "skeletal", as shown in FIGS. 1, 2 and 5, with a large open space between a curved outer arm frame element 19a and a straight inner arm frame element 19b. Also, the arm 19 has a counter-balancing portion 19c. The arm 19 is accordingly relatively low in mass, yet rigid and counter-balanced. Such configuration of the arm 19 provides for quick response to changes in sensed load condition.

Although preferred embodiments of the invention have been described and illustrated, it will be apparent to those skilled in the art that various modifications can be made without departing from the spirit of the invention.

What is claimed is:

1. An empty/load sensor mechanism for actuating a brake pressure control device of a vehicle in response to the load condition of the vehicle as represented by a distance between a sprung part and an unsprung part of the vehicle, the mechanism comprising: a body adapted to be mounted on the sprung part of the vehicle, a valve in said body for controlling braking pressure and an operating shaft connected to said valve and extending horizontally from said body; a pivotable sensing arm mounted at one end on said operating shaft for rotating said shaft and extending transversely to the axis of rotation of said operating shaft, said sensing arm having a free end remote from said operating shaft, and a generally horizontal contact shaft mounted on said free end for contact with the unsprung part of the vehicle, said contact shaft being mounted on said free end of the sensing arm by adjustable mounting means for adjusting the distance of said contact shaft from said operating shaft; said adjustable mounting means including a plate mounted on said sensing arm for rotation about a predetermined axis and said contact shaft being secured to said plate with its axis displaced from said predetermined axis.

2. In combination with a railroad car having a car body and truck, the car body and the truck being separated by a distance depending on the weight of the load on the car body, an empty/load sensor mechanism for actuating a brake pressure control device in response to the weight of the load on the car body as represented by said distance between the car body and the truck, the car body having a side sill with a side will web with an outboard surface facing in a first direction and inboard surface facing in a second direction opposite to said first direction and a side sill flange below said side will web and the truck having a side frame with an upper surface spaced from and below the side sill flange, said sensor mechanism being mounted on said inboard surface of said web above the side sill flange, said sensor mechanism having a rotatable and substantially horizontal operating shaft and having a pivotable sensor arm mounted at one end on said operating shaft and extending downwardly past said side sill flange, and said sensor arm carrying a horizontal contact shaft at its opposite, free end for contacting the upper surface of the truck side frame, said contact shaft extending between said flange and said upper surface, said contact shaft being mounted on said free end of the sensor arm by adjustable mounting means for adjusting the distance of said contact shaft from said operating shaft, said mounting means including a plate mounted on said sensing arm for rotation about a predetermined axis and said contact shaft being secured to said plate with its axis displaced from said predetermined axis, whereby the distance between the car body and truck determines the pressure.

* * * * *